(12) United States Patent
Villegas Muriel et al.

(10) Patent No.: US 9,944,148 B2
(45) Date of Patent: Apr. 17, 2018

(54) ANTI-ROLL SYSTEMS AND RELATED METHODS

(71) Applicant: Ford Global Technologies, LLC, Dearborn, MI (US)

(72) Inventors: Roberto Villegas Muriel, Atizapán de Zaragoza (MX); Jordi Vidauri, Mexico City (MX); Adrian Rueda, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/233,202

(22) Filed: Aug. 10, 2016

(65) Prior Publication Data

US 2018/0043744 A1   Feb. 15, 2018

(51) Int. Cl.
| | |
|---|---|
| *B60G 21/055* | (2006.01) |
| *B60G 21/073* | (2006.01) |
| *F16F 9/14* | (2006.01) |

(52) U.S. Cl.
CPC ..... *B60G 21/0551* (2013.01); *B60G 21/0558* (2013.01); *B60G 21/073* (2013.01); *F16F 9/14* (2013.01); *B60G 2202/22* (2013.01)

(58) Field of Classification Search
CPC ............ B60G 21/0558; B60G 21/0551; B60G 21/073; B60G 17/0162; B60G 2202/22; F16F 9/14
See application file for complete search history.

(56) References Cited

U.S. PATENT DOCUMENTS

| | | | |
|---|---|---|---|
| 4,613,153 A | 9/1986 | Shibahata et al. | |
| 4,648,620 A | 3/1987 | Nuss | |
| 5,305,858 A | 4/1994 | Haga et al. | |
| 5,632,502 A * | 5/1997 | Oppitz ............... | B60G 21/0555 267/277 |
| 5,700,027 A * | 12/1997 | Schiffler ............ | B60G 21/0555 280/124.162 |
| 5,791,444 A * | 8/1998 | Schiffler ............ | B60G 21/0555 188/293 |
| 5,826,687 A * | 10/1998 | Bungeler ........... | B60G 21/0555 188/296 |

(Continued)

FOREIGN PATENT DOCUMENTS

| | | |
|---|---|---|
| CN | 104827847 | 8/2015 |
| JP | H03227713 | 10/1991 |

(Continued)

OTHER PUBLICATIONS

BWIGroup, "Active Stabilizer Bar Systems," BWIGroup.com, located at http://www.bwigroup.com/en/pshow.php?pid=25, May 13, 2016, 2 pages.

*Primary Examiner* — Drew J Brown
(74) *Attorney, Agent, or Firm* — Frank MacKenzie; Hanley, Flight & Zimmerman, LLC

(57) ABSTRACT

Anti-roll systems and related methods are disclosed. An example anti-roll system includes a first stabilizer bar having a first end to operatively couple to a first wheel assembly of a vehicle and a second stabilizer bar having a first end to operatively couple to a second wheel assembly of the vehicle. A rotary damper is to couple a second end of the first stabilizer bar and a second end of the second stabilizer bar. A damping characteristic of the rotary damper is to vary based on a driving condition of the vehicle.

17 Claims, 12 Drawing Sheets

(56) References Cited

U.S. PATENT DOCUMENTS

| | | | |
|---|---|---|---|
| 5,987,366 A | 11/1999 | Jun | |
| 6,513,819 B1 | 2/2003 | Oliver et al. | |
| 6,811,166 B2 | 11/2004 | Carlstedt et al. | |
| 2004/0217569 A1* | 11/2004 | Gradu | B60G 21/0555 280/124.107 |
| 2014/0361474 A1* | 12/2014 | Hatzikakidis | B60G 15/06 267/140.14 |

FOREIGN PATENT DOCUMENTS

| | | | | |
|---|---|---|---|---|
| JP | 2008-49778 A | * | 3/2008 | ........... B60G 21/055 |
| KR | 100946508 | | 3/2010 | |

* cited by examiner

ANTI-ROLL SYSTEMS AND RELATED METHODS

FIELD OF THE DISCLOSURE

This disclosure relates generally to vehicles and, more particularly, to anti-roll systems and related methods.

BACKGROUND

To improve vehicle handling and ride characteristics (e.g., steering feel, agility, stability, etc.), vehicles employ suspension systems for absorbing road shock and other vibrations. For example, vehicles employ a stabilizer bar or anti-roll bar to reduce vehicle lean and wheel deflection during cornering. When a vehicle is turning a corner, for example, centrifugal forces cause the vehicle body to lean or roll away from the turn. A stabilizer bar reduces the amount of lean improving wheel traction and ride characteristics. While a stabilizer bar reduces body roll during cornering, a conventional stabilizer bar may transfer unwanted forces between the front wheels and/or rear wheels during certain operating conditions such as driving over uneven terrain (e.g., bumps), thereby affecting vehicle comfort and handling.

SUMMARY

An example apparatus includes a first stabilizer bar having a first end to operatively couple to a first wheel assembly of a vehicle and a second stabilizer bar having a first end to operatively couple to a second wheel assembly of the vehicle. A rotary damper is to couple a second end of the first stabilizer bar and a second end of the second stabilizer bar. A damping characteristic of the rotary damper is to vary based on a driving condition of the vehicle.

An example apparatus includes a rotary damper to affect relative rotation between a first stabilizer bar and a second stabilizer bar of a vehicle, a first amount of relative rotation corresponding to a first condition of the vehicle and a second amount of relative rotation corresponding to a second condition of the vehicle.

An example method includes positioning a rotary damper between a first stabilizer bar and a second stabilizer bar; coupling a first end of the first stabilizer bar to a first rotary member of the rotary damper; and coupling a first end of the second stabilizer bar to a second rotary member of the rotary damper.

Figure 1:
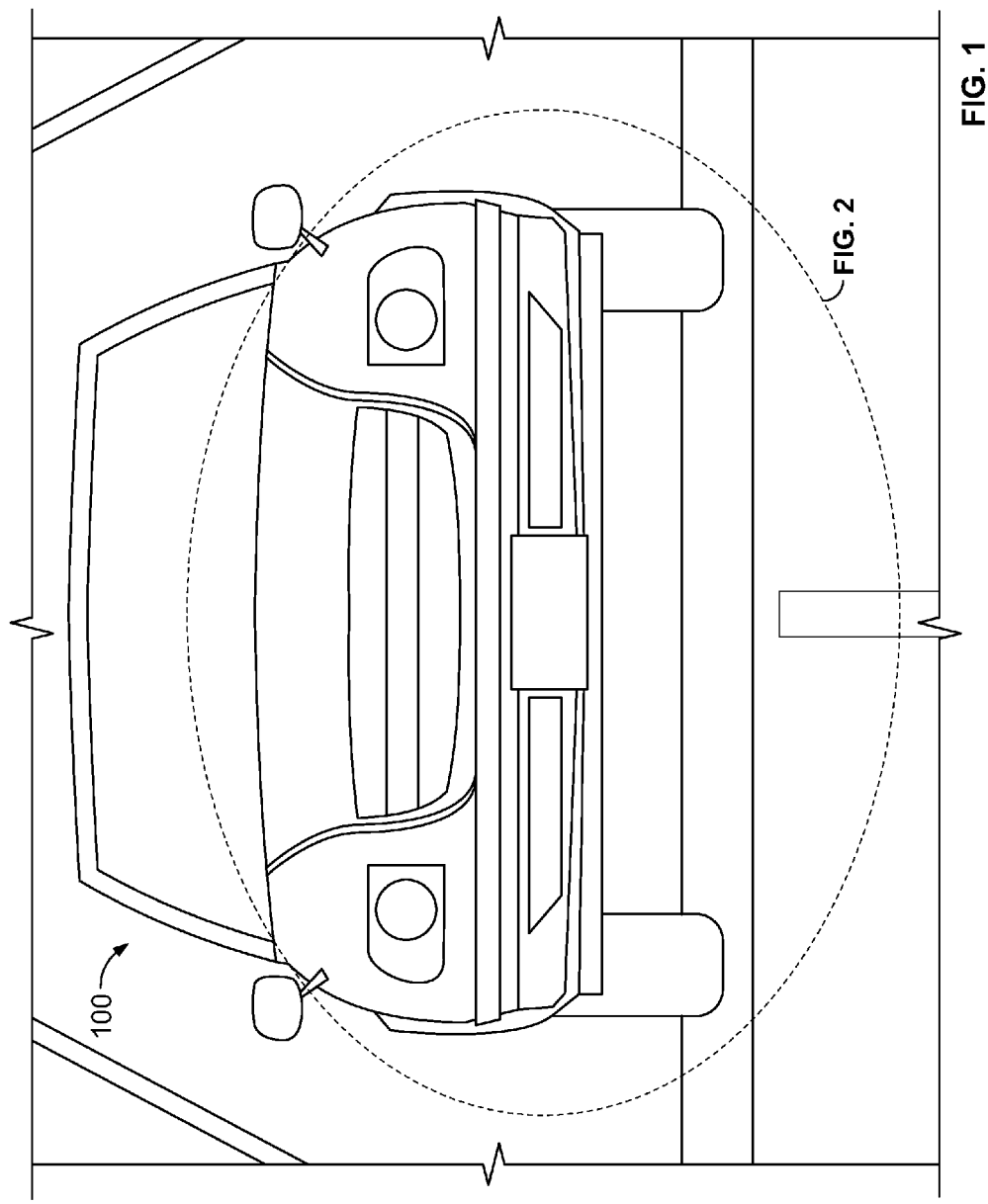
FIG. 1 is an example vehicle constructed in accordance with the teachings of this disclosure.

The figures are not to scale. Further, wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Conventional anti-roll bars, also known as stabilizer bars or sway bars, reduce body roll or lean when a vehicle is cornering to improve comfort and/or handling provided by the vehicle. While conventional anti-roll bars reduce body roll during cornering, conventional anti-roll bars can, in some instances, reduce vehicle comfort. For example, conventional anti-roll bars may reduce vehicle comfort when the vehicle traverses uneven terrain (e.g., a bumps, potholes, etc.). Thus, in certain driving conditions, eliminating or reducing the anti-roll bar effect may improve vehicle comfort.

In some examples, conventional anti-roll systems employ electrical or hydraulic systems to vary an effect of a stabilizer bar system. However, such electrical and hydraulic systems employ motors, pumps, actuators and/or hydraulic reservoirs (e.g., hydraulic pumps, etc.), which require either mechanical power directly from an engine or electrical power via an alternator of a vehicle. Thus, conventional systems add significant weight to a vehicle and require routing of hydraulic pipes or hoses in a relatively small space.

The example apparatus and related methods disclosed herein provide active anti-roll systems. More specifically, the anti-roll systems disclosed herein provide varying damping characteristic(s) (e.g., stiffness characteristics or performances) based on a driving condition of a vehicle. For example, to improve ride comfort and/or handling characteristic(s) during different vehicle conditions, the example anti-roll systems disclosed herein vary a stiffness of the anti-roll system to vary an amount of force that transfers between front wheels and/or rear wheels of a vehicle. In particular, the active anti-roll systems disclosed herein may operate in a first mode of operation to provide a stabilizer bar effect (e.g., increase the stabilizer effect), a second mode of operation to substantially eliminate the stabilizer bar effect, and/or a third or an intermediate mode of operation to reduce the stabilizer bar effect. As used herein, the stabilizer bar effect resists body roll caused by centrifugal force during cornering.

To select among the different modes of operation of the anti-roll systems disclosed herein (e.g., to vary the manner or degree of the transfer of forces between front wheels of a vehicle), the example anti-roll systems disclosed herein employ a rotary damper apparatus. To vary performance characteristic(s) of the anti-roll systems disclosed herein, the anti-roll systems disclosed herein vary a damping characteristic of the rotary damper based on a driving condition of the vehicle. For example, increasing a damping force of the rotary damper apparatus increases a stiffness characteristic (s) of the example anti-roll systems disclosed herein and decreasing a damping force of the damper apparatus decreases a stiffness characteristic(s) of the example anti-roll systems disclosed herein.

The example anti-roll systems disclosed herein employ mechanical or electro-mechanical apparatus that do not require motors or pumps as required with conventional electric and hydraulic anti-roll systems. Thus, the example anti-roll systems disclosed herein have a relatively small dimensional footprint compared to conventional electric and/or hydraulic systems.

Figure 2:
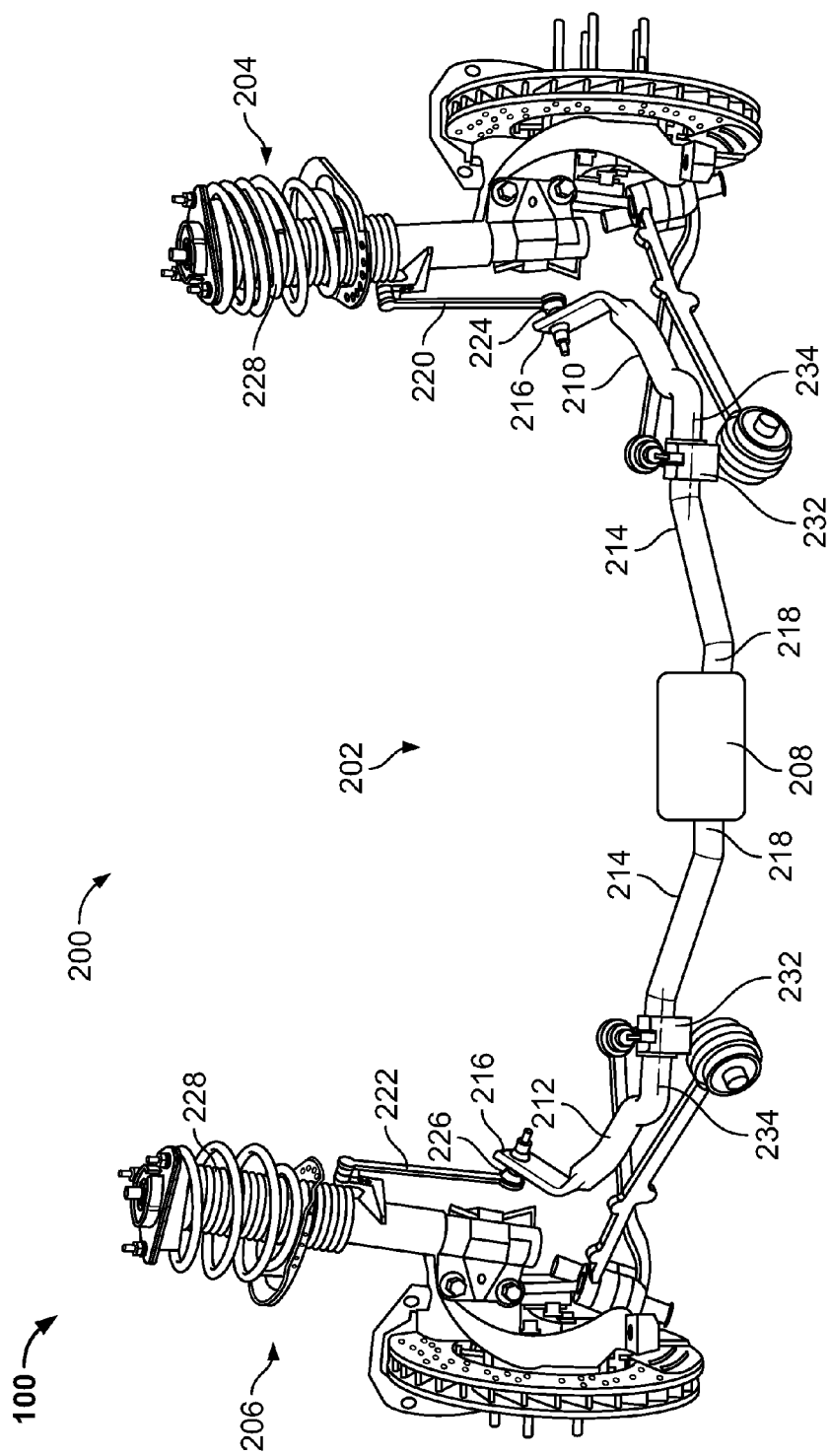
FIG. 2 is an example suspension of the example vehicle of FIG. 1 having an example anti-roll system disclosed herein.

FIG. 1 is an example vehicle 100 constructed in accordance with the teachings of this disclosure. FIG. 2 illustrates an example suspension 202 of the example vehicle 100 of FIG. 1 implemented with an example anti-roll system 200 disclosed herein. The suspension 202 of the illustrated example is a front suspension of the example vehicle 100. Although the example anti-roll system 200 of FIG. 2 is coupled to the suspension 202 of the vehicle 100, in some examples, the example anti-roll system 200 disclosed herein may be implemented with a rear suspension of the vehicle 100. The anti-roll system 200 disclosed herein allows the transfer of forces between the front wheels when the vehicle is in a first condition (e.g., a cornering condition) to reduce (e.g., minimize) body roll, and reduces (e.g., minimizes or substantially eliminates) the transfer of forces between the front wheels when the vehicle is in a second condition (e.g., a non-cornering condition, when the vehicle is traveling over uneven terrain, bumps, etc.).

Referring to FIG. 2, the anti-roll system 200 of the illustrated example selectively provides a first mode of operation and a second mode of operation. In the first mode, the anti-roll system 200 of the illustrated example increases a stiffness characteristic of the anti-roll system 200 to enable or increase the transfer of forces between a first side 204 of the suspension 202 (e.g., a first side of an axle assembly) and a second side 206 of the suspension 202 (e.g., a second side of an axle assembly) opposite the first side 204 of the suspension 202. In other words, the example anti-roll system 200 of the illustrated example increases a roll stiffness characteristic of the suspension 202 to reduce, for example, body roll or lean when the vehicle 100 is cornering. In the second mode, the anti-roll system 200 of the illustrated example reduces or substantially prevents the transfer of forces between the first side 204 and the second side 206 of the suspension 202. Thus, the greater the degree to which forces are transferred between the first side 204 and the second side 206 when the anti-roll system 200 is in the first mode than when the anti-roll system 200 is in the second mode. In other words, in the first mode, a force generated on one of the sides 204, 206 is efficiently coupled to the other side 204, 206. Such efficiency may approach or equal substantially 100%. In contrast, in the second mode, a force generated on one of the sides 204, 206 is substantially isolated from the other side 204, 206. Such isolation may approach or equal a substantially 0% coupling between the sides 204, 206. Put another way, the anti-roll system 200 may provide a variable coupling coefficient (e.g., the ratio of a force output from the anti-roll system divided by an input force), which may vary from zero to one for different vehicle operating conditions.

To select between the first mode and the second mode to vary the degree to which forces are transferred between the first side 204 and the second side 206 of the suspension 202, the anti-roll system 200 of the illustrated example includes a rotary damper system 208 coupled to a first stabilizer bar 210 and a second stabilizer bar 212. Each of the first stabilizer bar 210 and the second stabilizer bar 212 of the illustrated example includes a body 214 defining a first end 216 and a second end 218, respectively. For example, the body 214 of the illustrated example defines an L-shaped profile between the first end 216 and the second end 218. The first end 216 of the first stabilizer bar 210 of the illustrated example operatively couples to the first side 204 of the suspension 202 and the first end 216 of the second stabilizer bar 212 operatively couples to the second side 206 of the suspension 202.

In the illustrated example, a first link 220 couples the first end 216 of the first stabilizer bar 210 to the first side 204 of the suspension 202 and a second link 222 couples the first end 216 of the second stabilizer bar 212 to the second side 206 of the suspension 202. In particular, the first end 216 of the first stabilizer bar 210 is pivotally coupled to the first side 204 of the suspension 202 via a first bushing 224 and the first end 216 of the second stabilizer bar 212 is pivotally coupled to the second side 206 of the suspension 202 via a second bushing 226. In the illustrated example, the first link 220 and the second link 222 are attached to respective struts 228 (e.g., MacPherson struts) of the suspension 202. In some examples, the first link 220 and/or the second link 222 may be coupled to a shock absorber, a spring, a control arm, a steering knuckle, an axle, a wheel assembly and/or any other portion of the suspension 202, a frame or a subframe of the vehicle 100 without affecting the operation or function of the anti-roll system 200 disclosed herein. In some examples, the first link 220 and/or the second link 222 are not provided. In some such examples, the first end 216 of the first stabilizer bar 210 and/or the first end 216 of the second stabilizer bar 212 may couple (e.g., directly attach) to a shock absorber, a spring, a control arm, a steering knuckle, an axle, a wheel assembly and/or any other portion of the suspension, a frame or a subframe of the vehicle 100 without affecting the operation or function of the anti-roll system 200 disclosed herein.

The first stabilizer bar 210 and the second stabilizer bar 212 of the illustrated example are rotatably coupled to a frame or subframe of the vehicle 100 via bushings 232. The bushings 232 enable the body 214 of the first stabilizer bar 210 and/or the body 214 of the second stabilizer bar 212 to rotate relative to a rotational axis 234 of the body 214 (e.g., when the first end 216 of the first stabilizer bar 210 and/or the second stabilizer bar 212 is pivoted relative to the vehicle 100).

In the illustrated example, the rotary damper system 208 is positioned between the second end 218 of the first stabilizer bar 210 and the second end 218 of the second stabilizer bar 212. As described in greater detail below, the rotary damper system 208 of the illustrated example is coupled to the first stabilizer bar 210 and second stabilizer bar 212 and varies an amount of or a degree to which force transfers between the first stabilizer bar 210 and the second stabilizer bar 212 based on a condition of the vehicle 100. For example, to enable forces imparted to the first side 204 of the suspension 202 to be conveyed to the second side 206 of the suspension 202 via the first stabilizer bar 210 and second stabilizer bar 212, the rotary damper system 208 prevents relative rotation between the first stabilizer bar 210 and the second stabilizer bar 212. To substantially prevent or reduce transmission of forces between the first side 204 of the suspension 202 and the second side 206 of the suspension 202, the rotary damper system 208 of the illustrated example allows relative rotation between the first stabilizer bar 210 and the second stabilizer bar 212.

Figure 3:
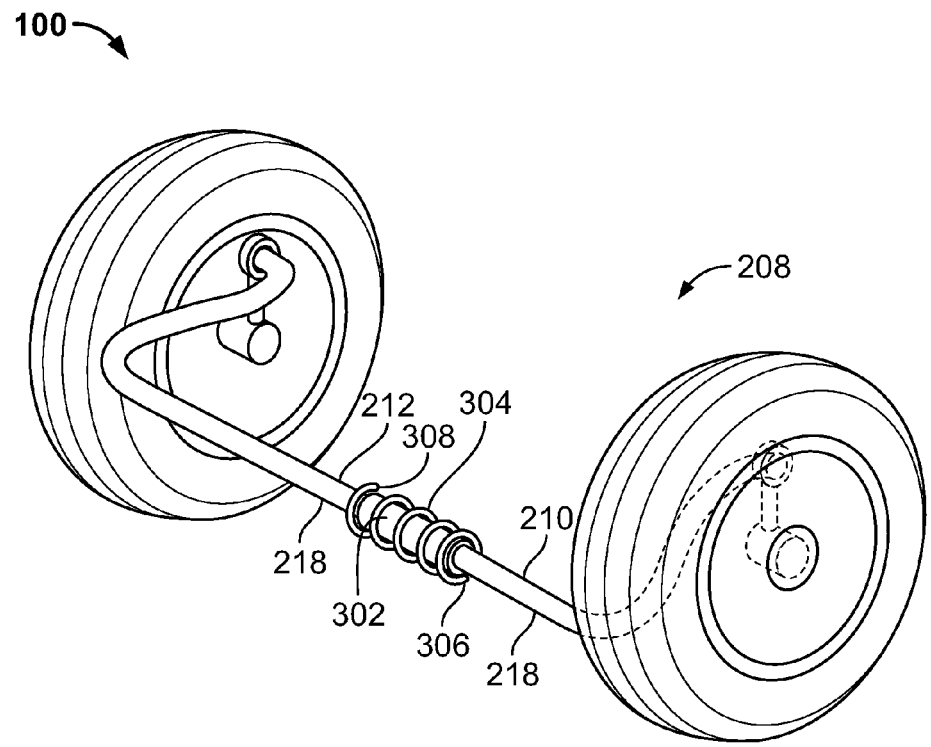
FIG. 3 is a schematic illustration of the example anti-roll system of FIG. 2.

FIG. 3 is a schematic illustration of the anti-roll system 200 of FIG. 2. Referring to FIG. 3, the rotary damper system 208 of the illustrated example includes a rotary damper 302 and a biasing element or spring 304. The rotary damper 302 is positioned between the second end 218 of the first stabilizer bar 210 and the second end 218 of the second stabilizer bar 212. In particular, the rotary damper 302 is not coupled to the frame or the subframe of the vehicle 100, but is supported by the rotary damper system 208 (e.g., the first stabilizer bar 210, the second stabilizer bar 212 and/or the spring 304). The spring 304 of the illustrated example includes a first end 306 coupled adjacent (e.g., attached to) the second end 218 of the first stabilizer bar 210 and a second end 308 coupled adjacent (e.g., attached to) the second end 218 of the second stabilizer bar 212. In some examples, the spring 304 of the illustrated example absorbs some or all of the forces transmitted between the first side 204 and the second side 206 of the suspension 202 when the anti-roll system 200 is in the first mode and/or the second mode. Additionally or alternatively, the spring 304 of the illustrated example causes the first stabilizer bar 210 and/or the second stabilizer bar 212 to return to an initial position (e.g., a rest position) when the first stabilizer bar 210 and/or the second stabilizer bar 212 rotate about the rotational axis 234 relative to the frame of the vehicle 100. In other words, the spring 304 of the illustrated example balances or resets the anti-roll system 200 (e.g., when the wheels of the vehicle return to substantially level terrain) to a starting position or condition.

Figure 4A:
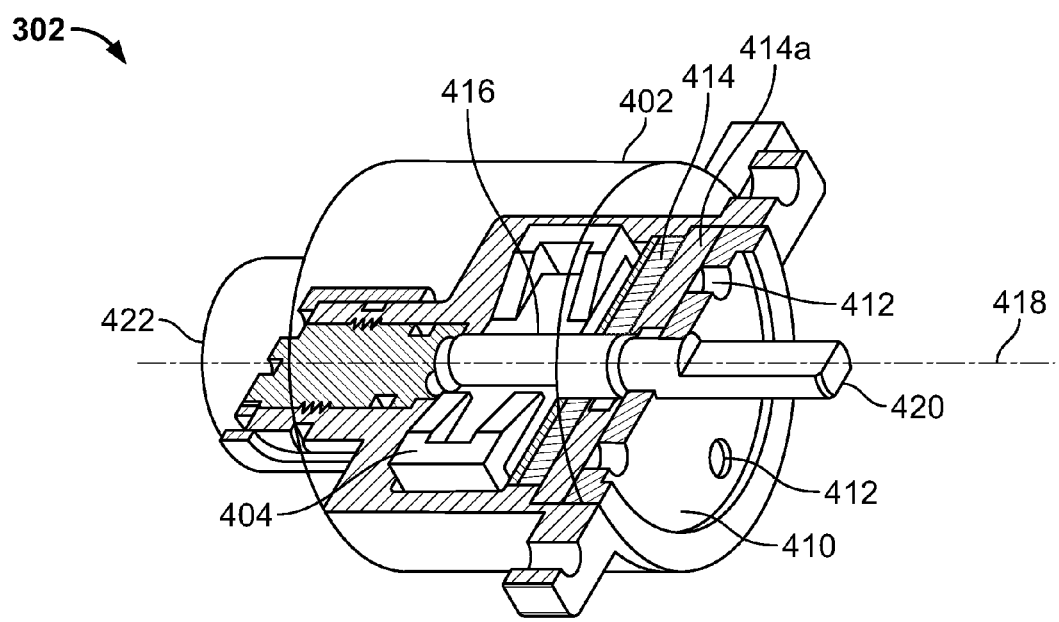
FIG. 4A illustrates an example rotary damper that may be used to implement the example anti-roll system of FIGS. 2 and 3.
Figure 4B:
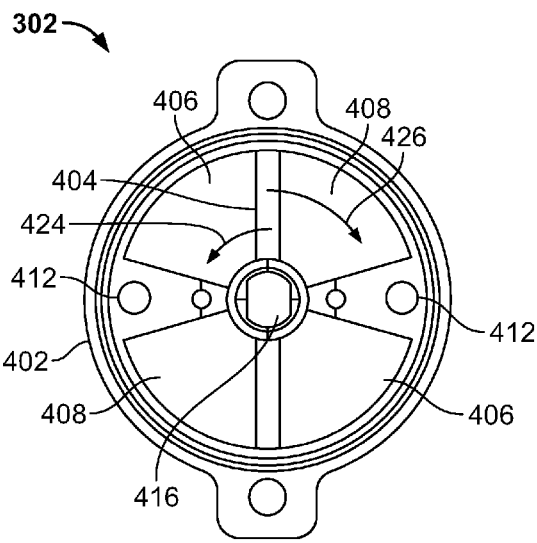
FIG. 4B is another view of the example rotary damper of FIG. 4A.
Figure 4C:
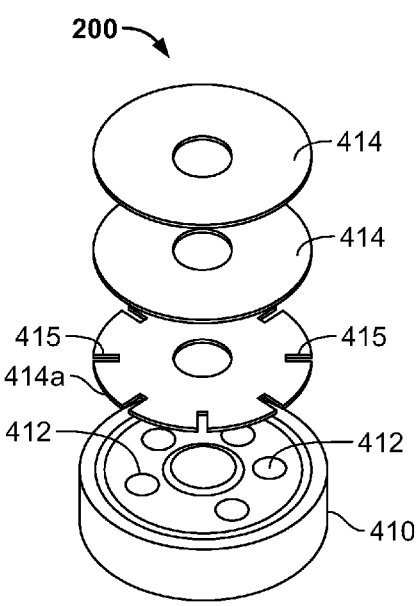
FIG. 4C is a partially exploded view of the example rotary damper of FIGS. 4A and 4B.

FIG. 4A illustrates the example rotary damper 302 of the example anti-roll system of FIGS. 2 and 3. FIG. 4B is another view of the example rotary damper 302 of FIG. 4A. FIG. 4C is a partially exploded view of the example rotary damper 302 of FIGS. 4A and 4B. Referring to FIGS. 4A-4C, the rotary damper 302 of the illustrated example includes a housing 402 and a first rotary member 404 (e.g., a vane, a rotor, etc.) rotatably coupled to the housing 402. The first rotary member 404 and the housing 402 of the illustrated example define a first chamber 406 and a second chamber 408 that contain a control fluid such as, for example, silicon oil or other fluid(s) having high viscosity characteristic(s). The rotary damper 302 of the illustrated example includes an end plate 410 having orifices 412 to fluidly couple the first chamber 406 and the second chamber 408. For example, the orifices 412 throttle the control fluid as the control fluid moves between the first chamber 406 and the second chamber 408. The rotary damper 302 of the illustrated example includes a plurality of stacked plates 414 and a bleed plate 414a positioned between the end plate 410 and the first rotary member 404. The bleed plate 414a of the illustrated example includes bleed holes 415.

The rotary damper 302 includes a shaft 416 coupled to the first rotary member 404. The shaft 416 of the illustrated example rotates with the first rotary member 404 about a longitudinal axis 418 of the rotary damper 302. The shaft 416 of the illustrated example has a first end 420 coupled (e.g., welded) to the second end 218 of the first stabilizer bar 210. For example, the first rotary member 404 may rotate relative to the housing 402 when the first stabilizer bar 210 rotates about the rotational axis 234 and the anti-roll system 200 is in the second mode of operation. In some examples, the longitudinal axis 418 of the rotary damper 302 is substantially parallel (e.g., coaxial) with the rotational axis 234 of the first stabilizer bar 210 and/or the second stabilizer bar 212. In some examples, the axis of rotation of the rotary damper 302 is substantially horizontal relative to the frame of a vehicle 100.

The rotary damper 302 of the illustrated example includes a second rotary member 422. In the illustrated example, the second rotary member 422 is the housing 402. For example, the housing 402 of the rotary damper 302 is coupled to the second end 218 of the second stabilizer bar 212. For example, the housing 402 may rotate relative to the first rotary member 404 when the second stabilizer bar 212 rotates about the rotational axis 234 and the anti-roll system 200 is in the second mode of operation. In some examples, a rotary damper apparatus may include a first vane to provide the first rotary member coupled to the first stabilizer bar 210 and a second vane to provide the second rotary member coupled to the second stabilizer bar 212.

In some examples, the shaft 416 may be coupled to the first stabilizer bar 210 and/or the second rotary member 422 may be coupled to the second stabilizer bar 212 via fasteners, clamps, and/or any other fastener(s). In some examples, the shaft 416 may be coupled to the first stabilizer bar 210 and/or the second rotary member 422 may be coupled to the second stabilizer bar 212 via an adaptor, a coupler, a gear or a gear train, a transmission and/or any other fastener(s).

The example rotary damper 302 of the illustrated example is a velocity-sensitive damping device. In other words, the rotary damper 302 of the illustrated example operates based on a rotational speed input about the longitudinal axis 418 to change the mode of operation of the anti-roll system 200 (e.g., between the first mode of operation and the second mode of operation). For example, the rotary damper 302 outputs a damping force that is dependent on a rotational speed input provided by the first stabilizer bar 210 to the first rotary member 404 and/or a rotational speed input provided by the second stabilizer bar 212 to the second rotary member 422.

In the illustrated example, the faster the first rotary member 404 and/or the second rotary member 422 rotates relative to the longitudinal axis 418, the smaller the damping force generated by the rotary damper 302. When the damping force is relatively small, the first rotary member 404 and/or the second rotary member 422 rotate relative to each other. In other words, the first rotary member 404 and the second rotary member 422 may rotate independently of each other. On the contrary, the slower the rotational input speed provided to the first rotary member 404 and/or the second rotary member 422, the greater the damping force generated by the rotary damper 302. When the damping force output is relatively large, the first rotary member 404 and the second rotary member 422 rotate together (e.g., in unison or as unitary structure) when one of the first rotary member 404 or the second rotary member 422 is rotated about the longitudinal axis 418.

In particular, a damping force output based on a speed input is based on an alignment between the orifices 412 of the end plate 410 and the bleed holes 415 of the bleed plate 414a. For example, the rotary damper 302 provides a high damping force output when the bleed holes 415 of the bleed plate 414a are positioned in an offset relationship relative to the orifices 412 of the end plate 410 (e.g., a longitudinal axis of the bleed holes 415 is offset or not aligned with a longitudinal axis of the orifices 412). On the contrary, the rotary damper 302 provides a low damping force output when the bleed holes 415 of the bleed plate 414a are aligned with respective ones of the orifices 412 of the end plate 410 (e.g., a longitudinal axis of the bleed holes 415 is aligned or coaxial with a longitudinal axis of the orifices 412). A resistive force (e.g., a frictional force) between the stacked plates 414 and the bleed plate 414a controls rotation of the bleed plate 414a and/or the stacked plates 414 relative to the longitudinal axis 418.

In operation, rotation of the first stabilizer bar 210 about the rotational axis 234 causes the first rotary member 404 to rotate between a first direction 424 and a second direction 426 opposite the first direction 424. In turn, the first rotary member 404 causes displacement of the control fluid between the first chamber 406 and the second chamber 408.

When a relatively slow input force is applied (e.g., cornering scenario) to the first stabilizer bar 210, a pressure of the control fluid displaced by the first rotary member 404 is relatively low or not sufficient to overcome a stiffness or resistive force (e.g., a frictional force) of the stacked plates 414 and/or the bleed plate 414a and cause the bleed plate 414a to rotate about the longitudinal axis 418. As a result, the bleed holes 415 are misaligned or offset relative to the orifices 412 of the end plate 410, thereby increasing a restriction of a fluid path between the first chamber 406 and the second chamber 408. In other words, the offset relationship between the bleed holes 415 and the orifices 412 provide a tortuous flow path when the control fluid is displaced between the first chamber 406 and the second chamber 408. Thus, as the first rotary member 404 rotates in the housing 402, the first rotary member 404 forces the control fluid through gaps between the first rotary member 404 and the housing 402 (e.g., an inner surface of the housing 402) and through the constriction (e.g., tortuous path) provided by the offset relationship between the bleed holes 415 and the orifices 412. The bleed holes 415 have a relatively small diameter and allow only a small volume of the control fluid to pass through, which increases a frictional force (e.g., a resistive force) between the first rotary member 404 and the second rotary member 422 (e.g., the housing 402). As a result, a large damping force output is generated by the rotary damper 302, which causes the first rotary member 404 and the second rotary member 422 to rotate together (e.g., simultaneously or in unison).

When a relatively fast changing input force is applied (e.g., via a pothole), a pressure of a control fluid displaced by the first rotary member 404 is relatively high or sufficient to overcome a stiffness or frictional force of the stacked plates 414 and/or the bleed plate 414a and cause the bleed plate 414a to turn or rotate about the longitudinal axis 418. In turn, the bleed holes 415 of the bleed plate 414a substantially align with the orifices 412 of the end plate 410 to reduce the fluid path restriction between the first chamber 406 and the second chamber 408. The orifices 412 of the end plate 410 allow the control fluid in the first chamber 406 to flow to the second chamber 408 via the orifices 412 with a smaller amount of restriction or resistance compared to when the bleed holes 415 are offset relative to the orifices 412. Thus, the control fluid flows between the first chamber 406 and the second chamber 408 with relatively low resistance, which decreases a frictional force (e.g., a resistive force) between the first rotary member 404 and the second rotary member 422 (e.g., the housing 402). As a result, a small damping force output is generated by the rotary damper 302, which allows the first rotary member 404 to rotate (e.g., freely or independently) relative to the second rotary member 422.

Figure 4D:
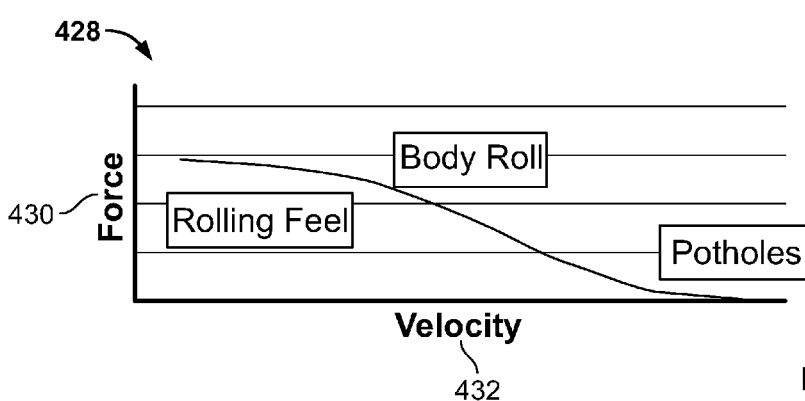
FIG. 4D is a force versus velocity graph of the example rotary damper of FIGS. 4A-4C.

In some examples, characteristic(s) of the rotary damper 302 may be configured to provide a desired damping force output based on a speed input. For example, FIG. 4D illustrates a graphical representation of a damping force versus velocity 428 that may be provided by configuring characteristic(s) of the rotary damper 302. In the illustrated example, a damping force output 430 is plotted on the y-axis and a velocity input 432 is plotted on the x-axis. As shown in the illustrated example, as the velocity input increases, the damping force output decreases. In some examples, some characteristic(s) of the rotary damper 302 that may be configured to provide different damping force outputs based on speed inputs include, for example, the number of bleed holes 415 and/or orifices 412, the number of stacked plates 414, a size (e.g., diameter) of the bleed holes 415 and/or the orifices 412, a resistive force between the bleed plate 414a and the stacked plates 414, etc. In some examples, a resistance of the bleed plate 414a may be configured with a greater amount of resistance to rotation about the longitudinal axis 418 than a resistance of the stacked plates 414. In some examples, the orifices 412 may be configured with diameters to allow a greater amount of flow for fluids having high velocity. In some examples, the example rotary damper system 208 disclosed herein may employ different types of dampers or shock absorbers and/or other devices providing damping forces.

Figure 5A:
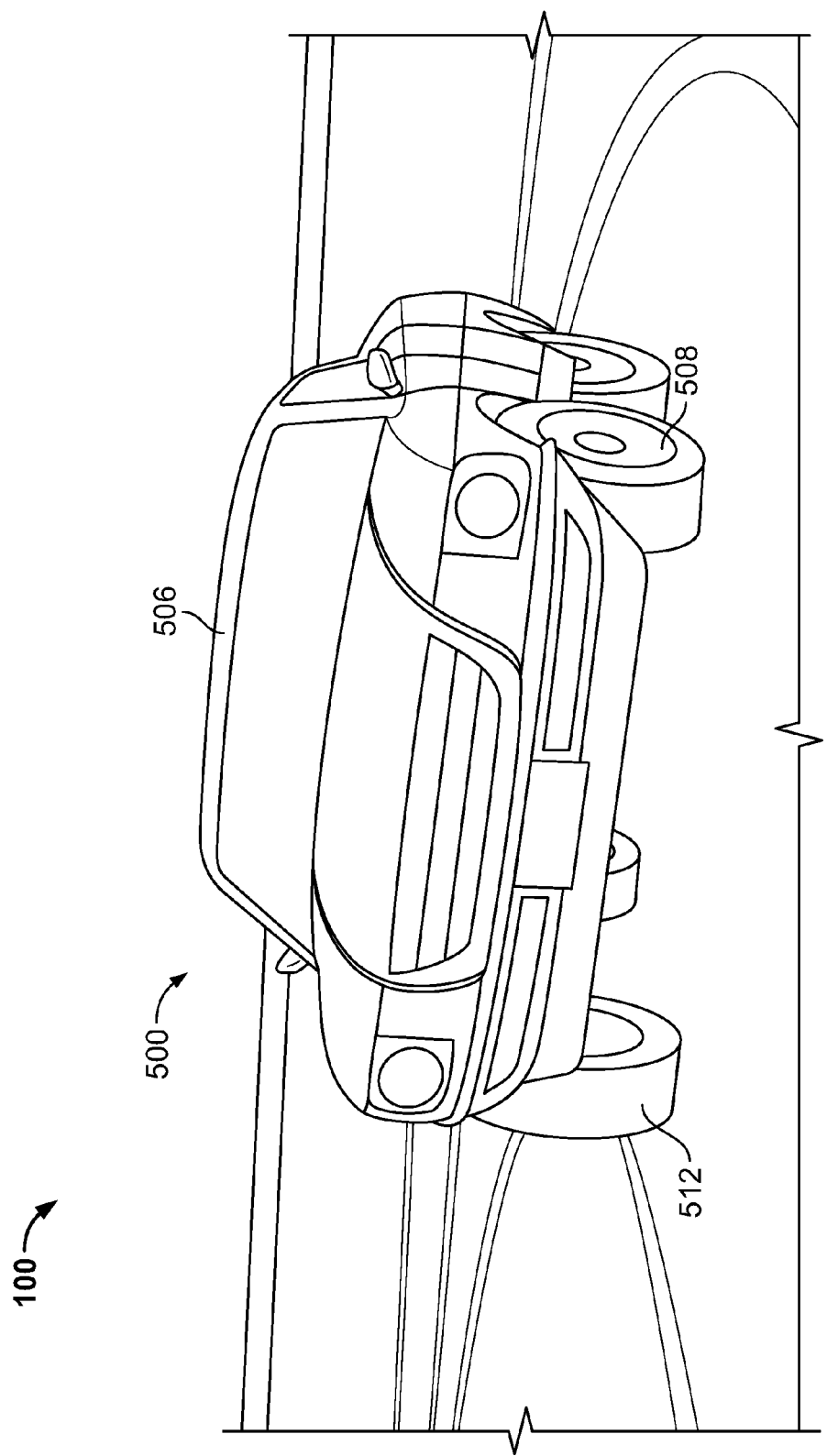
FIG. 5A illustrates the example vehicle of FIG. 1 in a first condition.
Figure 5B:
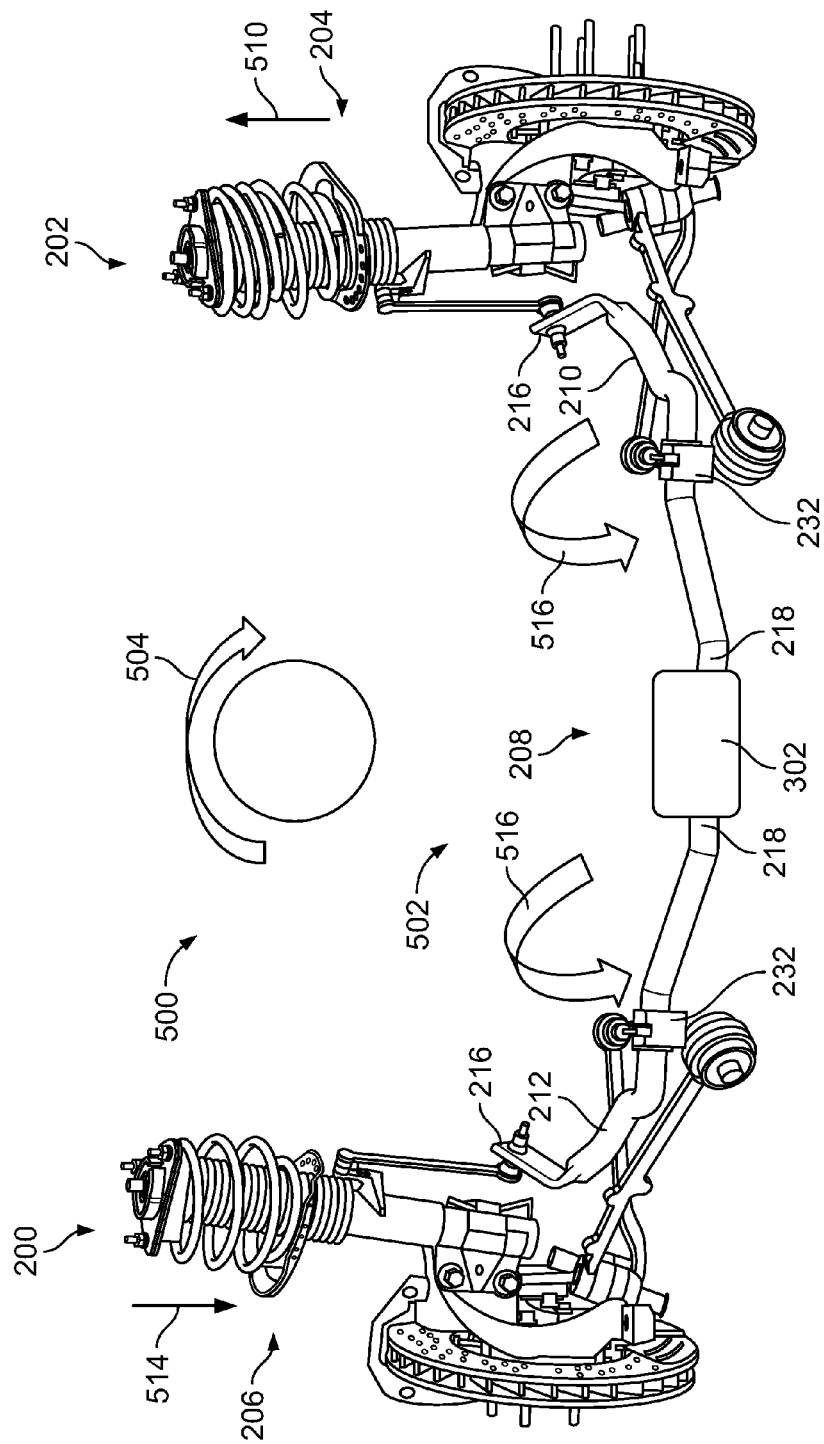
FIG. 5B is a schematic illustration of the example anti-roll system of FIGS. 2 and 3 in a first mode of operation corresponding to the first condition of the vehicle shown in FIG. 5A.

FIG. 5A illustrates the example vehicle 100 of FIG. 1 in a first condition 500. FIG. 5B is a schematic illustration of the example anti-roll system 200 of FIG. 2 in a first mode of operation 502 (e.g., an active condition) in response to the first condition 500 of the vehicle 100 shown in FIG. 5A.

Referring to FIGS. 5A and 5B, the first condition 500 of the illustrated example is a cornering condition. During cornering (e.g. when the vehicle 100 is turning), centrifugal forces 504 cause a body 506 of the vehicle 100 to lean away from the turn, which tends to cause inertial forces adjacent a wheel 508 (e.g., an outer wheel) to move in a first direction 510 (e.g., an upward direction in the orientation of FIG. 5B). In the first mode of operation 502, the anti-roll system 200 of the illustrated example reduces (e.g., minimizes or eliminates) an amount of lean of the body 506 during cornering by providing a force to a wheel 512 (e.g., an inner wheel) in a second direction 514 (e.g., in a downward direction in the orientation of FIG. 5B) to improve traction and/or leveling of the vehicle 100.

In the first mode of operation 502, the rotary damper system 208, (e.g., the first stabilizer bar 210 and the second stabilizer bar 212) act as a torsion spring. In the illustrated example of FIGS. 5A and 5B, the first stabilizer bar 210 in a rotational direction 516 causes rotation of the second stabilizer bar 212 in the rotational direction 516, resulting in transfer of forces between the first side 204 of the suspension 202 and the second side 206 of the suspension 202 to apply a downward force to the wheel 512 to reduce the amount of lean, thereby improving vehicle handling and ride characteristic(s).

During cornering, forces from the first side 204 of the suspension 202 provide a rotational speed input to the rotary damper 302 via the first stabilizer bar 210 when the vehicle 100 turns in a first direction (e.g., as shown in FIG. 5A) or, alternatively, forces from the second side 206 of the suspension 202 provide a rotational speed input to the rotary damper 302 via the second stabilizer bar 210 when the vehicle 100 turns in a second direction opposite the first direction. The rotational speeds are gradual or relatively slow (e.g., compared to a rotational speed provided by a force due to the vehicle 100 impacting or traversing a bump). For example, a gradual rotational speed of the first rotary member 404 in the first direction 424 may result from the vehicle 100 turning a corner or curve at a speed of between approximately 20 miles/hour and 35 miles/hour. As noted above in connection with FIGS. 4A-4D, due to a relatively slow rotational speed input to the rotary damper 302 via the first stabilizer bar 210 or the second stabilizer bar 212, the damping force output generated by the rotary damper 302 is relatively large. The large damping force output generated by the rotary damper 302 causes rotation of the first stabilizer bar 210 and the second stabilizer bar 212 via the first rotary member 404 and the second rotary member 422. Thus, forces imparted to the first side 204 of the suspension 202 transfer to the second side 206 of the suspension 202 via the anti-roll system 200, or vice versa. After the turning condition is complete, the spring 304 returns or causes the first stabilizer bar 210 and/or the second stabilizer bar 212 to rotate in a direction opposite the rotational direction 516 to return the first stabilizer bar 210, the second stabilizer bar 212, the spring 304, the first rotary member 404 and/or the second rotary member 422 to an initial position (e.g., a position prior to the vehicle 100 starting the corning condition).

Figure 6A:
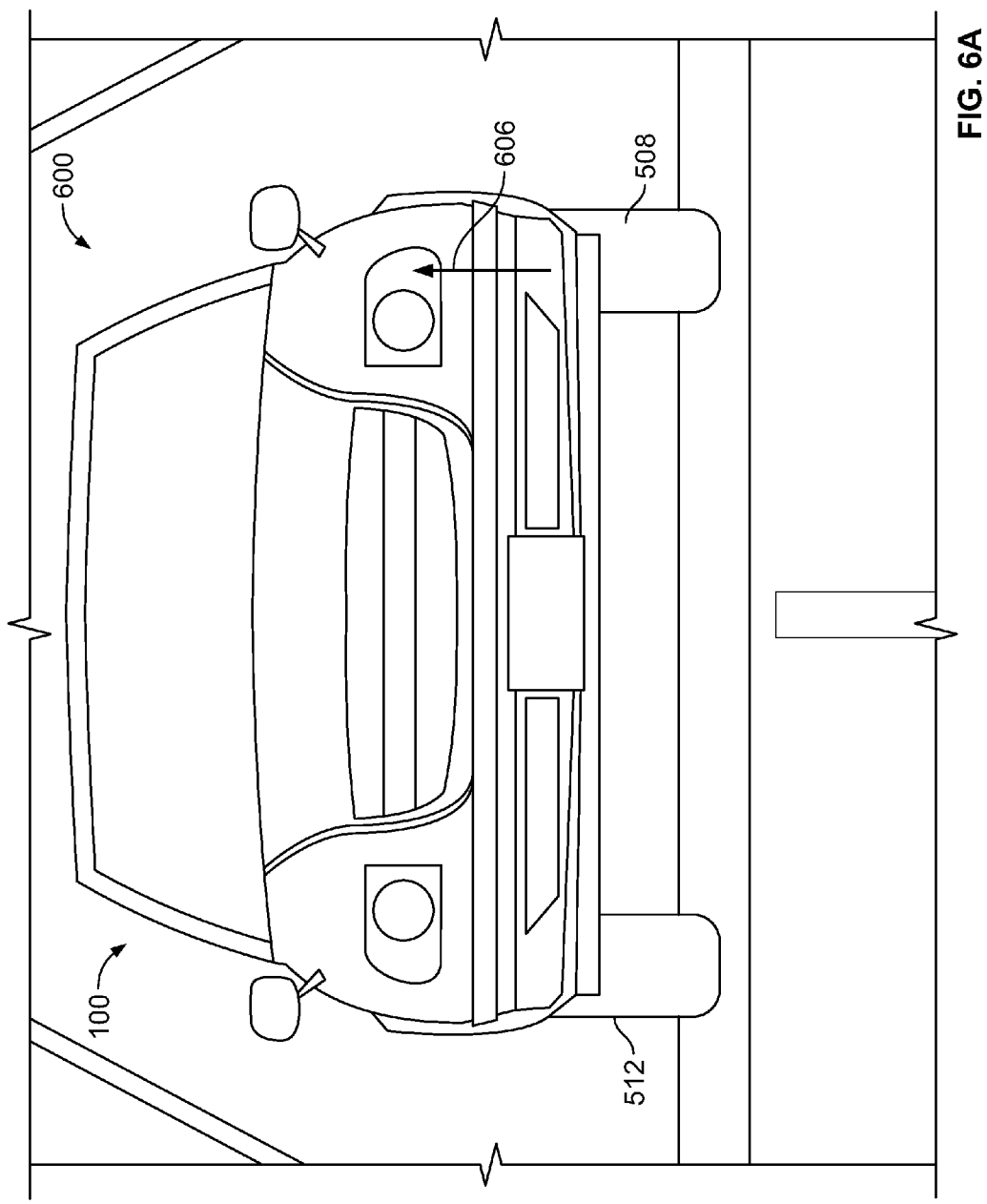
FIG. 6A illustrates the example vehicle of FIG. 1 in a second condition.
Figure 6B:
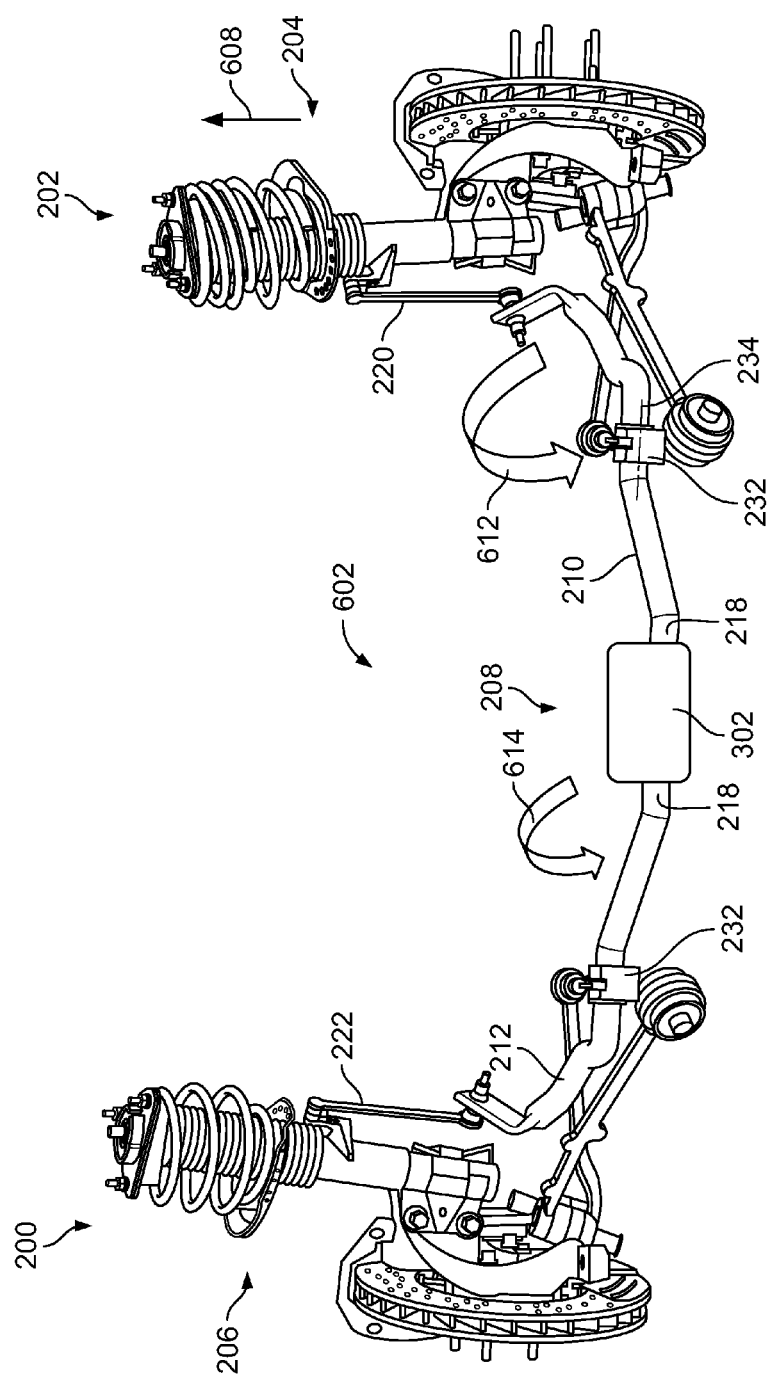
FIG. 6B is a schematic illustration of the example anti-roll system of FIGS. 2 and 3 in a second mode of operation corresponding to the second condition of the vehicle shown in FIG. 6A.

FIG. 6A illustrates the example vehicle 100 of FIG. 1 in a second condition 600. FIG. 6B is a schematic illustration of the example anti-roll system 200 of FIGS. 2 and 3 in a second mode of operation 602 corresponding to the second condition 600 of the vehicle 100 shown in FIG. 6A. For example, in the second condition 600, the wheel 508 of the vehicle 100 impacts or traverses a bump or uneven terrain 606. If the anti-roll system 200 was in the first mode of operation 502 while the vehicle 100 traverses the uneven terrain 606, a jarring or bump to the wheel 508 can also jar the opposite wheel 512 due to the transfer of forces between the first stabilizer bar 210 and the second stabilizer bar 212. For example, with the anti-roll system 200 in the first mode of operation 502, the vehicle 100 when traversing, for example, several potholes scattered in the road would cause the vehicle 100 to rock side-to-side, or waddle, due to the action of the first stabilizer bar 210 at the wheel 508 and the second stabilizer bar 212 at the wheel 512, thereby resulting in an uncomfortable or bouncy ride.

To reduce or eliminate transfer of forces between the first stabilizer bar 210 and the second stabilizer bar 212 due to jarring or traversing uneven terrain 606, the rotary damper system 208 of the illustrated example provides the second mode of operation 602 based on a relatively fast acting force imparted to the rotary damper system 208. For example, when the vehicle 100 moves over the bump or uneven terrain 606, a force directed in a first direction 608 (e.g., an upward direction in the orientation of FIG. 6B) imparts a relatively fast rotational force on the first stabilizer bar 210 via the first link 220, causing the first stabilizer bar 210 to rotate relative to the rotational axis 234 in a first rotational direction 612. However, as noted above in connection with FIGS. 4A-4D, a relatively fast rotational speed input to the rotary damper 302 via the first stabilizer bar 210 causes the rotary damper 302 to generate a relatively small damping force output. As noted above, when the rotary damper 302 generates a relatively small damping force output, the first rotary member 404 rotates (e.g., independently) relative to the second rotary member 422. Thus, the rotary damper 302 prevents or reduces transfer of forces between the first side 204 of the suspension 202 and the second side 206 of the suspension 202. In some examples, the spring 304 absorbs all or some of the forces transmitting from the first stabilizer bar 210. In some examples, the spring 304 may transfer negligible amount of forces between the first side 204 and the second side 206, which may cause the second stabilizer bar 212 to rotate (e.g., slightly) in the first rotational direction 614. However, the rotation of the second stabilizer bar 212 is significantly less than the rotation of the first stabilizer bar 210.

Figure 7:
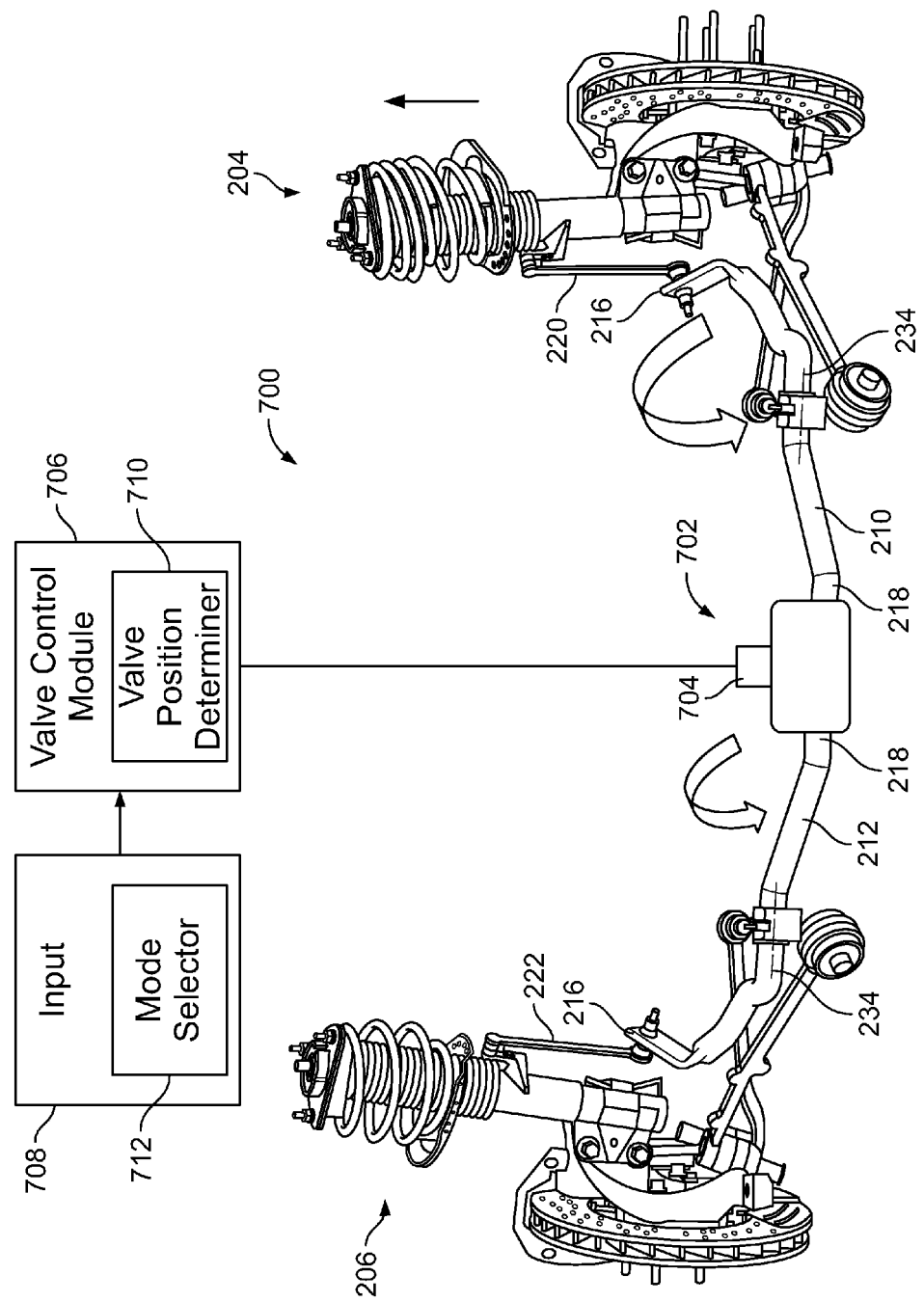
FIG. 7 illustrates another example anti-roll system disclosed herein having an example valve control module in accordance with the teachings of this disclosure.

FIG. 7 illustrates another example anti-roll system 700 disclosed herein. Those components of the example anti-roll system 700 of FIG. 7 that are substantially similar or identical to the components of the example anti-roll system 200 described above and that have functions substantially similar or identical to the functions of those components will not be described in detail again below. Instead, the interested reader is referred to the above corresponding descriptions. To facilitate this process, similar reference numbers will be used for like structures. For example, the anti-roll system 700 includes a suspension 202 having a first side 204 and a second side 206. For example, the anti-roll system 700 includes a first stabilizer bar 210 and a second stabilizer bar 212, where the first stabilizer bar 210 has a first end 216 coupled to the first side 204 of the suspension 202 via a first link 220 and the second stabilizer bar 212 has a first end 216 coupled to the second side 206 of the suspension 202 via a second link 222.

Referring to FIG. 7, the anti-roll system 700 of the illustrated example employs a rotary damper 702. The rotary damper 702 of the illustrated example operates between different modes of operation to vary an amount of force transfer between the first side 204 of the suspension 202 and the second side 206 of the suspension 202.

To select between different modes of operation, the rotary damper 702 of the illustrated example employs a valve 704 (e.g., a solenoid valve, a control valve, etc.). The valve 704 of the illustrated example provides a variable restriction to vary a flow rate of a control fluid between a first portion of the rotary damper and a second portion of the rotary damper. To adjust or vary a restriction of the rotary damper 702, the valve 704 of the illustrated example is positionable between a first position (e.g., a fully closed position), a second position (e.g., a fully open position), and a plurality of intermediate positions between the first position and the second position.

To control a position of the valve 704, the anti-roll system 700 of the illustrated example employs a valve control module 706. For example, the valve control module 706 of the illustrated example causes the valve 704 to move between the first position to provide a first mode of operation of the anti-roll system 700, the second position to provide a second mode operation of the anti-roll system 700, and/or a plurality of intermediate positions between the first position and the second position to provide a third mode of operation. For example, the valve control module 706 may provide a signal (e.g., an electric signal) to the valve 704 to cause the valve to move to the first position (e.g., the fully closed position), the second position (e.g., the fully open position), and/or an intermediate position.

For example, in the first mode of operation (e.g., when the valve 704 is in the first position), the anti-roll system 700 of the illustrated example enables transfer of forces between the first side 204 of the suspension 202 and a second side 206 of the suspension 202 via the rotary damper 702, the first stabilizer bar 210 and the second stabilizer bar 212. To provide the first mode of operation, the valve 704 is positioned in the first position (e.g., a fully closed position). In the first mode of operation, the rotary damper 702 of the illustrated example generates a relative large damping force (e.g., an increase in friction or resistance force) to prevent or restrict rotational movement between the first stabilizer bar 210 and the second stabilizer bar 212 via the rotary damper 702 (e.g., to enable the first stabilizer bar 210 to rotate the second stabilizer bar 212). For example, a rotational angle (e.g., 30 degrees) of the first stabilizer bar 210 about the rotational axis 234 causes a substantially equal rotational angle (e.g., between 28 degrees and 30 degrees) of the second stabilizer bar 212 relative to the rotational axis 234.

To provide the second mode of operation, the valve 704 of the illustrated example moves to the second position (e.g., an open position). For example, in the second mode of operation (e.g., when the valve 704 is in the second position), the anti-roll system 700 of the illustrated example (e.g., the rotary damper 702) prevents the transfer of forces between the first side 204 of the suspension 202 and the second side 206 of the suspension 202 via the rotary damper 702, the first stabilizer bar 210 and the second stabilizer bar 212. In the second mode of operation, the rotary damper 702 generates a relatively small damping force to enable the first stabilizer bar 210 to rotate relative to the second stabilizer bar 212. For example, if the first stabilizer bar 210 rotates an angle of approximately 20 degrees about the rotational axis 234, the second stabilizer bar 212 rotates an angle of approximately zero degrees and 2 degrees about the rotational axis 234. In some examples, a spring of the rotary damper 702 may absorb some of the forces imparted to the rotary damper 702 and/or may cause a slight rotation (e.g., between approximately 1 degree and 10 degrees of rotation) of the second stabilizer bar 212 relative to the rotational axis 234.

In some examples, to provide the third mode of operation to vary an amount of sway bar effect (e.g., to vary a damping force output of the rotary damper 702), the valve 704 of the illustrated example may move to an intermediate position between the first position and the closed position. For example, in the intermediate position, the rotary damper 702 may limit the sway bar effect by varying (e.g., increasing or decreasing) an amount of force transfer between the first side 204 of the suspension 202 and the second side 206 of the suspension 202 via the first stabilizer bar 210 and the second stabilizer bar 212. For example, the rotary damper 702 may allow a percentage of force to transfer between the first side 204 and the second side 206 by adjusting, via a position of the valve 704, an amount of damping force output to be generated by the rotary damper 702. For example, adjusting the damping force output of the rotary damper 702 may cause the second stabilizer bar 212 to rotate a certain percentage (e.g., between approximately 20 percent and 50 percent) of a rotational angle of the first stabilizer bar 210. In other words, the rotation of the second stabilizer bar 212 about the rotational axis 234 is less compared to a rotation of the first stabilizer bar 210 about the rotational axis 234. For example, if the first stabilizer bar rotates an angle of approximately 35 degrees about the rotational axis 234, the rotary damper 702 in the intermediate condition may generate damping force that causes the second stabilizer bar 212 to rotate at an angle of between approximately 15 degrees and 30 degrees) about the rotational axis 234.

The valve control module 706 of the illustrated example commands or causes the valve 704 to move to a position corresponding to a position representative of the signal received from an input 708. To determine and/or control the position of the valve 704, the valve control module 706 of the illustrated example includes a valve position determiner 710. For example, to determine a position of the valve 704, the valve control module 706 of the illustrated example receives and/or analyzes the input 708. Based on the signal provided by the input 708, the valve position determiner 710 determines or adjusts a position of the valve 704.

The input 708 of the illustrated example provides a signal generated by a mode selector 712. In some examples, the mode selector 712 may include a user interface (e.g., a switch, a display, etc.) accessible via an interior of the vehicle 100. For example, the user interface may include a manual switch selectable by user of the vehicle 100. Thus, the input 708 of the illustrated example may be a manual input. The mode selector 712 may include a plurality of different modes of operation of the anti-roll system 700 of FIG. 7. For example, the mode selector 712 may include a plurality of selectable modes including, but not limited, an off-road mode, a sport mode, a comfort mode, and/or any other mode to vary a stiffness of the anti-roll system 700. The valve position determiner 710 moves the valve 704 to a position corresponding to the selected mode of the mode selector 712.

For example, if a sport mode is selected, the valve position determiner 710 moves the valve 704 to the first position (e.g., a closed position to prevent or restrict fluid flow between the chambers) to provide the anti-roll system 700 with greater stiffness characteristics and/or allow the transfer of forces between the first side 204 and the second side 206. In some examples, selection of an off-road mode may cause the valve position determiner 710 to move the valve 704 to the second position (e.g., the fully open position) to reduce or eliminate a stiffness characteristic of the anti-roll system 700 and/or reduce or prevent transfer of forces between the first side 204 and the second side 206. In some examples, selection of the comfort mode may cause the valve position determiner 710 to move the valve 704 to the intermediate position (e.g., between a fully closed position and a fully open position) to vary the sway bar effect of the anti-roll system 700 and/or vary an mount of force that transfers between the first side 204 and the second side 206.

Figure 8:
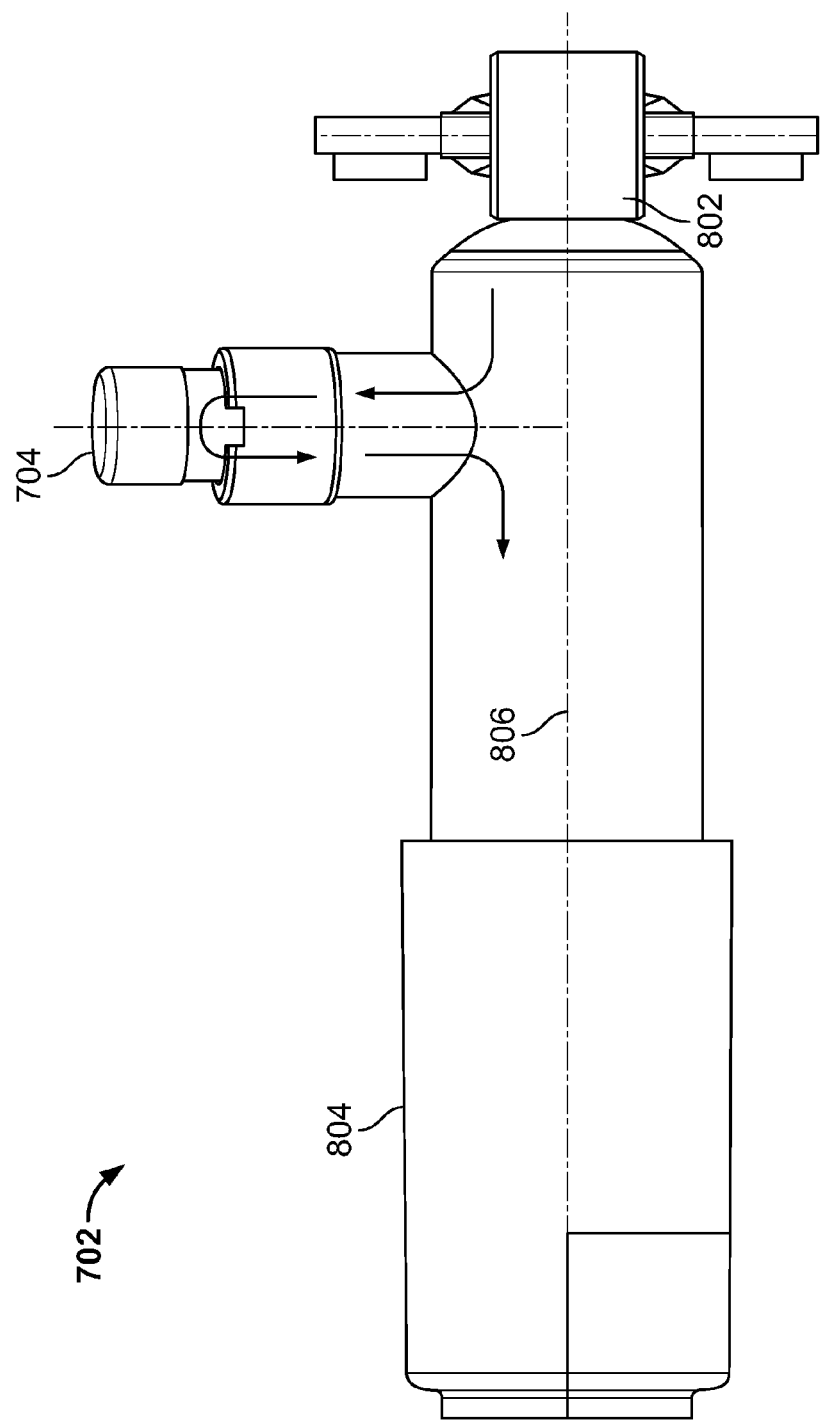
FIG. 8 illustrates another example rotary damper that may be used to implement the example anti-roll system of FIG. 7.

FIG. 8 is a side view of the rotary damper 702 of FIG. 7. For example, the rotary damper 702 includes a rotary portion 802 (e.g., a rotor, a vane, a piston, etc.) rotatably coupled relative to the housing 804 and positioned in housing 804 to define a first chamber and a second chamber. The valve 704 is coupled to the housing 804 and includes a control member movable relative to a valve seat to control fluid flow between the first chamber of the rotary damper 702, the second chamber of the rotary damper 702 and/or a reservoir chamber (e.g., positioned in the housing 804). The rotary portion 802 may be coupled to the second end 218 of the first stabilizer bar 210 and the housing 804 may be coupled to the second end 218 of the second stabilizer bar 212. In some examples, a longitudinal axis 806 of the rotary damper 702 is substantially parallel (e.g., coaxial) with the rotational axis 234 of the first stabilizer bar 210 and/or the second stabilizer bar 212. In some examples, the axis of rotation of the rotary damper 702 is substantially horizontal relative to a frame (e.g., a horizontal member of a frame) of the vehicle 100.

In the first position (e.g., a fully closed position), the valve 704 prevents fluid flow between the first chamber of the rotary damper 702 and a second chamber of the rotary damper 702, thereby increasing a resistance to the control fluid of the rotary damper 702. As a result, the rotary damper apparatus generates relatively large damping force output, causing the rotary portion 802 and the housing 804 rotate together (e.g., in unison, as a unitary structure, etc.) about a longitudinal axis 806. In this manner, the first stabilizer bar 210 and the second stabilizer bar 212 rotate together about the rotational axis 234 (FIG. 7). Thus, when the vehicle 100 is in the first condition 500 (e.g., cornering), the anti-roll system 700 of the illustrated example is in a first mode of operation to allow transfer of forces between the first side 204 of the suspension 202 and the second side 206 of the suspension 202.

In the second position (e.g., a fully open position), the valve 704 allows a control fluid to flow between the first chamber of the rotary damper 702 and the second chamber of the rotary damper 702 with a relatively small resistance. As a result, the rotary damper 702 generates a relatively small damping force output, causing the rotary portion 802 and the housing 804 rotate (e.g., freely or independently) relative to each other about a longitudinal axis 806. In this manner, the first stabilizer bar 210 and the second stabilizer bar 212 rotate substantially independently about the rotational axis 234 (FIG. 7). In some instances, a biasing element of the rotary damper 702 coupling the first stabilizer bar 210 and the second stabilizer bar 212 may cause a negligible amount of rotation between the first stabilizer bar 210 and the second stabilizer bar 212 when one of the first stabilizer bar 210 or the second stabilizer bar 212 rotates relative to the rotational axis 234 and the valve 704 is in the second position (e.g., the second mode of operation). Thus, when the vehicle 100 is in the second condition 600 (e.g., traversing a bump), the anti-roll system 700 of the illustrated example is in a second mode of operation to substantially prevent or restrict transfer of forces between the first side 204 of the suspension 202 and the second side 206 of the suspension 202.

In the intermediate position (e.g., any position between the first position and the second position), the valve 704 restricts (but does not prevent) fluid flow between the first chamber and the second chamber of the rotary damper 702. For example, in the intermediate position, the valve 704 allows more fluid flow compared to the first position and less fluid flow compared to the second position, to vary an amount of damping force output generated by the rotary damper 702. The greater the amount of damping force generated, the greater the amount of force transfer between the first side 204 and the second side 206 of the suspension 202. For example, in a third mode of operation (e.g., when the valve 704 is in an intermediate position), the anti-roll system 700 provides stiffness characteristics that allow a certain percentage of force transfer (e.g., between approximately 1 percent and 99 percent) between the first side 204 and the second side 206 of the suspension 202.

Thus, the valve control module 706 may control a position of the valve 704 to vary a flow rate of a control fluid of the rotary damper 702 to adjust a damping force output of the rotary damper 702. In some examples, the rotary damper 702 may be a twin-tube rotary shock absorber, a mono-tube rotary shock absorber, and/or any other suitable damping apparatus. In some examples, the rotary damper 302 of FIGS. 4A and 4B may employ the valve 704 to control fluid flow between the first chamber 406 and the second chamber 408.

Figure 9:
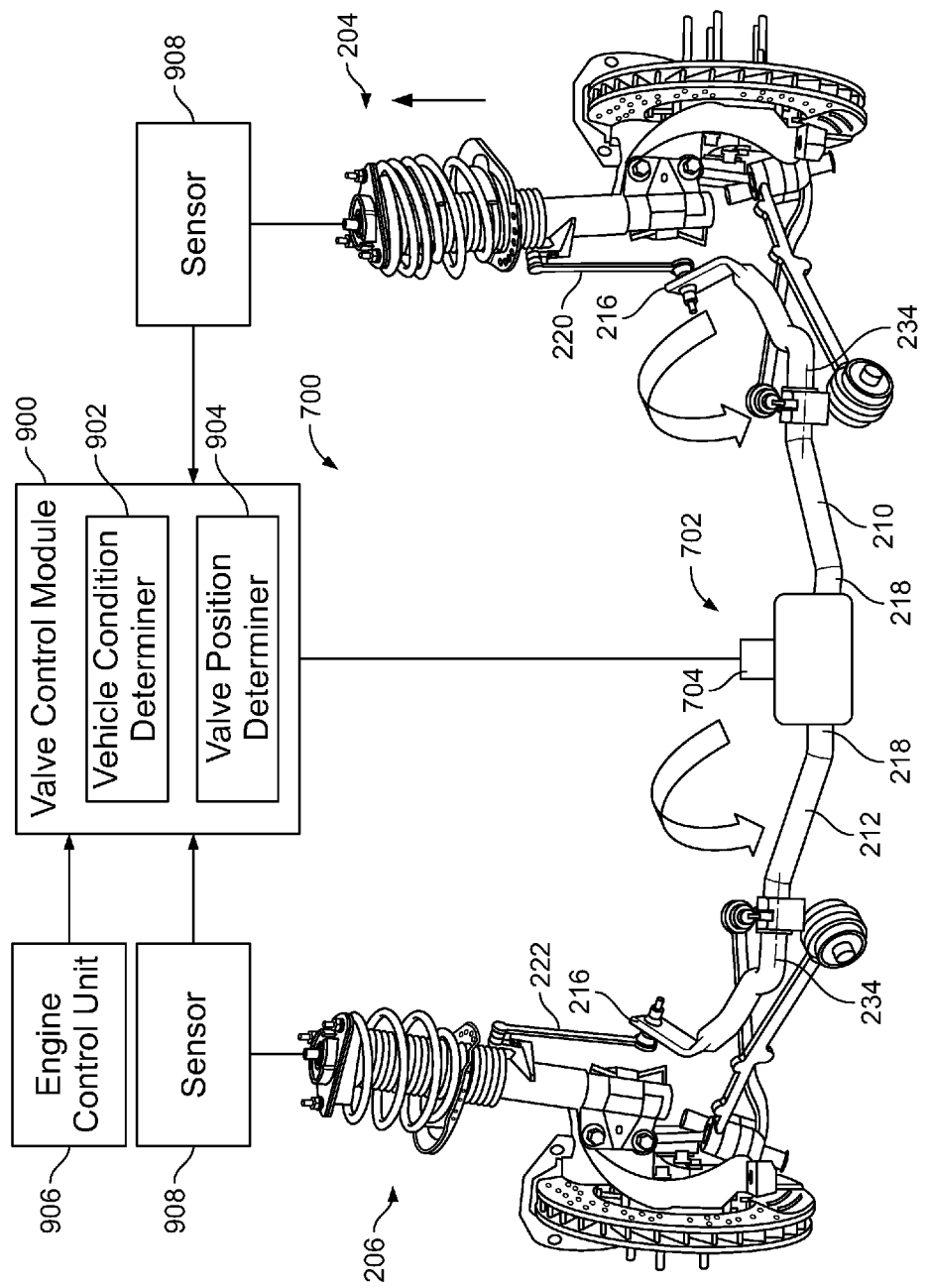
FIG. 9 illustrates the example anti-roll system of FIG. 7, but having another example valve control module disclosed herein.

FIG. 9 illustrate the example anti-roll systems 700 of FIG. 7 implemented with another vehicle control module 900. The example vehicle control module 900 of the illustrated example includes a vehicle condition determiner 902 and a valve position determiner 904. The vehicle condition determiner 902 determines a condition of a vehicle and the valve position determiner 904 detects or determines if the valve 704 is in a position corresponding to the detected vehicle condition.

For example, the vehicle control module 900 receives a signal or information from an engine control unit 906 and/or other sensors 908 of the vehicle 100. Based on the received information, the vehicle condition determiner 902 may determine or detect a certain driving condition of the vehicle 100. Based on the detected driving condition, the vehicle control module 900 varies or adjusts a stiffness of the anti-roll system 700 based on changing driving conditions. For example, the signals or information provided by the engine control unit 906 and/or the sensor 908 may include, but not limited, an angle of a steering wheel of the vehicle 100, a yaw rate, vehicle speed, lateral acceleration, and/or any other information to determine a condition of the vehicle 100.

For example, based on the information received from the engine control unit 906 and/or the sensors 908, the vehicle condition determiner 902 determines if the vehicle 100 is in a first condition (e.g., the first condition 500 of FIG. 5A), a second condition (e.g., the second condition 600 of FIG. 6A) and/or any other condition (e.g., an off-road condition). In some examples, the valve position determiner 904 determines a position of the valve 704 of FIG. 7 to adjust a stiffness characteristic (e.g., a damping output force) of the rotary damper 702 based on the detected condition of the vehicle 100. For example, the valve position determiner 904 commands the valve 704 to vary a flow restriction and/or a flow rate of a control fluid between a first portion (e.g., a first chamber) of the rotary damper 702 and a second portion (e.g., a second chamber) of the rotary damper 702 based on detected condition of the vehicle 100. In turn, varying a flow restriction of the rotary damper 702 adjusts a damping force output of the rotary damper 702 based on the detected condition of the vehicle 100.

In some examples, the valve position determiner 904 determines a position of the valve 704. The valve position determiner 904 determines if a position of the valve 704 corresponds to a position of the valve 704 representative of the detected condition of the vehicle 100. For example, the valve position determiner 904 may employ a comparator, a look-up table, a logic circuit, etc. to determine if the position of the valve 704 corresponds to a detected condition of the vehicle based on the analyzed input signal provided by an input (e.g., the engine control unit 906 and/or the sensors 908). If the valve position determiner 904 determines that the positioner of the valve 704 does not correspond to the detected vehicle condition provided by the vehicle condition determiner 902, the valve position determiner 904 adjusts the position of the valve 704 to correspond to the determined vehicle condition.

Figure 10:
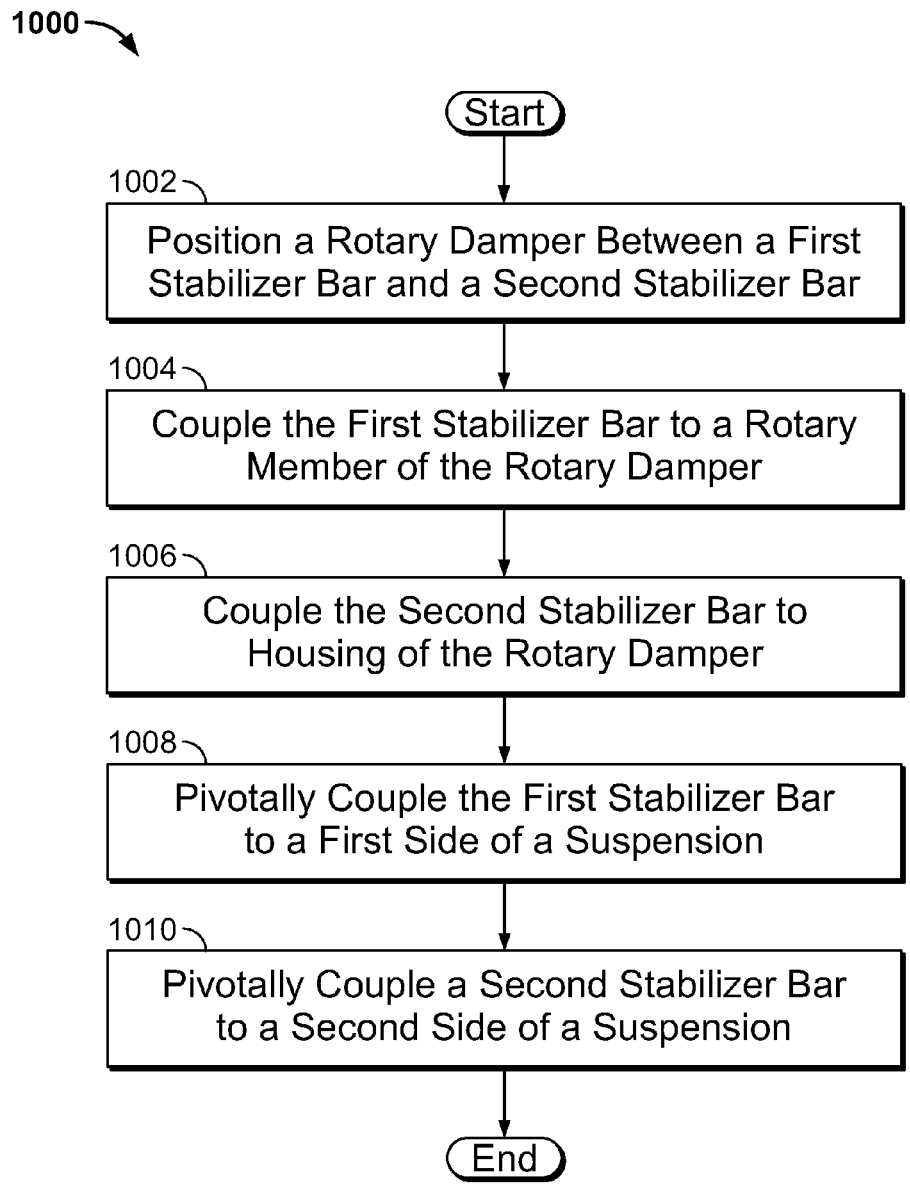
FIG. 10 is a flowchart representative of an example method of manufacturing an example anti-roll system disclosed herein.

FIG. 10 is a flowchart of an example method that may be used to manufacture the example anti-roll system 200 and 700 disclosed herein. While an example manner of manufacturing the example anti-roll systems 200 and 700 has been illustrated in FIG. 10, one or more of the steps and/or processes illustrated in FIG. 10 may be combined, divided, re-arranged, omitted, eliminated and/or implemented in any other way. Further still, the example method of FIG. 10 may include one or more processes and/or steps in addition to, or instead of, those illustrated in FIG. 10, and/or may include more than one of any or all of the illustrated processes and/or steps. Further, although the example method is described with reference to the flow chart illustrated in FIG. 10, many other methods of manufacturing the example anti-roll systems 200 and 700 may alternatively be used.

Referring to FIG. 10, a rotary damper is positioned between an end of a first stabilizer bar and a second end of a second stabilizer bar (block 1002). For example, the example rotary damper 302 and/or the example rotary damper 702 may be mounted between the first stabilizer bar 210 and the second stabilizer bar 212. In some examples, the rotary damper 302 or 702 may be positioned at a midpoint between the first stabilizer bar 210 and the second stabilizer bar 212.

The end of the first stabilizer bar is coupled to a rotary member of a rotary damper (block 1004). For example, the second end 218 of the first stabilizer bar 210 is coupled to the first rotary member 404 of the rotary damper 302 or the rotary portion 802 of the rotary damper 702. The end of the second stabilizer bar is coupled to a housing of the rotary damper (block 1006). For example, the second end 218 of the second stabilizer bar 212 is coupled to the housing 402 of the rotary damper 302 or the housing 804 of the rotary damper 702. In some examples, the method 1000 of FIG. 10 includes coupling a first end 306 of a spring 304 to the second end 218 of the first stabilizer bar 210 and coupling a second end 308 of the spring 304 to the second end 218 of the second stabilizer bar 212.

The end of the first stabilizer bar is pivotally coupled to a first side of a suspension (block 1008) and an end of the second stabilizer bar 212 is pivotally coupled to a second side of the suspension (block 1010). For example, the first end 216 of the first stabilizer bar 210 may be pivotally coupled to the first side 204 of the suspension 202 via the first link 220 and the first bushing 224, and the first end 216 of the second stabilizer bar 212 is pivotally coupled to the second side 206 of the suspension 202 via the second link 222 and the second bushing 226.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first stabilizer bar having a first end to operatively couple to a first wheel assembly of a vehicle;
a second stabilizer bar having a first end to operatively couple to a second wheel assembly of the vehicle; and
a rotary damper to couple a second end of the first stabilizer bar and a second end of the second stabilizer bar, a damping characteristic of the rotary damper to vary based on a driving condition of the vehicle, the rotary damper to vary the damping characteristic without receiving electrical power.

2. The apparatus of claim 1, wherein the rotary damper includes a rotary vane, a first end of the rotary vane to couple to the second end of the first stabilizer bar and a second end of the rotary vane to couple to the second end of the second stabilizer bar.

3. The apparatus of claim 1, wherein the rotary damper is to provide a first damping force when the vehicle is in a first condition, and the rotary damper is to provide a second damping force when the vehicle is in a second condition different than the second condition.

4. An apparatus comprising:
a first stabilizer bar having a first end to operatively couple to a first wheel assembly of a vehicle;
a second stabilizer bar having a first end to operatively couple to a second wheel assembly of the vehicle; and
a rotary damper to couple a second end of the first stabilizer bar and a second end of the second stabilizer bar, a damping characteristic of the rotary damper to vary based on a driving condition of the vehicle, the rotary damper including a spring, a first end of the spring to couple to the second end of the first stabilizer bar and a second end of the spring to couple to the second end of the second stabilizer bar.

5. The apparatus of claim 4, wherein the rotary damper has a control valve to provide a variable restrictor.

6. An apparatus comprising:
a rotary damper to affect relative rotation between a first stabilizer bar and a second stabilizer bar of a vehicle, a first amount of relative rotation corresponding to a first condition of the vehicle and a second amount of relative rotation corresponding to a second condition of the vehicle, the rotary damper including a rotary member positioned in a housing to define a first chamber and a second chamber, a plurality of stacked plates, a bleed plate having bleed holes, and an end plate having orifices.

7. The apparatus of claim 6, wherein a first end of the first stabilizer bar is to pivotally couple to a first side of a suspension of the vehicle, and a first end of the second stabilize bar is to pivotally couple to a second side of the suspension of the vehicle.

8. The apparatus of claim 6, wherein the bleed holes of the bleed plate are to move relative to the orifices to vary a damping force of the rotary damper.

9. The apparatus of claim 6, further including a solenoid valve operatively coupled to the rotary damper, the solenoid valve to vary a flow rate of a control fluid between a first portion of the rotary damper and a second portion of the rotary damper to vary a damping force of the rotary damper based on the vehicle being in at least one of the first condition or the second condition.

10. An apparatus comprising:
a rotary damper to affect relative rotation between a first stabilizer bar and a second stabilizer bar of a vehicle, a first amount of relative rotation corresponding to a first condition of the vehicle and a second amount of relative rotation corresponding to a second condition of the vehicle, wherein a first end of the first stabilizer bar is to pivotally couple to a first side of a suspension of the vehicle, and a first end of the second stabilize bar is to pivotally couple to a second side of the suspension of the vehicle, the rotary damper includes a first rotary member and a second rotary member, the first rotary member to couple to a second end of the first stabilizer bar and the second rotary member to couple to a second end of the second stabilizer bar; and
a spring, a first end of the spring to couple to the second end of the first stabilizer bar and a second end of the spring to couple to the second end of the second stabilizer bar.

11. The apparatus of claim 10, wherein the rotary damper is to generate a first damping force when the vehicle is in the first condition.

12. The apparatus of claim 11, wherein the rotary damper is to generate a second damping force greater than the first damping force when the vehicle is in the second condition.

13. A method comprising:
- positioning a rotary damper between a second end of a first stabilizer bar and a second end of a second stabilizer bar;
- coupling the second end of the first stabilizer bar to a first rotary member of the rotary damper;
- coupling the second end of the second stabilizer bar to a second rotary member of the rotary damper; and
- coupling a first end of a spring to the second end of the first stabilizer bar and coupling a second end of the spring to the second end of the second stabilizer bar.

14. The method of claim 13, wherein the positioning of the rotary damper includes positioning the rotary damper at a midpoint between the first stabilizer bar and the second stabilizer bar.

15. The method of claim 13, further including operatively coupling a solenoid valve to the rotary damper.

16. The method of claim 15, further including controlling a position of the solenoid valve to vary a flow rate of a control fluid of the rotary damper to adjust a damping characteristic of the rotary damper.

17. The method of claim 13, further including pivotally coupling a first end of the first stabilizer bar to a first side of a suspension of a vehicle, and pivotally coupling a first end of a second stabilizer bar to a second side of the suspension.

\* \* \* \* \*